United States Patent [19]

Cheng

[11] 4,312,643
[45] Jan. 26, 1982

[54] REMOVAL OF SULFUR COMPOUNDS FROM COMBUSTION PRODUCT EXHAUST

[75] Inventor: Dah Y. Cheng, Palo Alto, Calif.

[73] Assignee: International Power Technology, Inc., Palo Alto, Calif.

[21] Appl. No.: 883,029

[22] Filed: Mar. 3, 1978

[51] Int. Cl.³ .............................................. B01D 47/00
[52] U.S. Cl. .......................................... 55/73; 55/49; 55/53; 423/242; 423/522
[58] Field of Search ................... 55/46, 49, 51, 53, 52, 55/56, 57, 73, 68, 39; 423/242, 243, 521, 522

[56] References Cited

U.S. PATENT DOCUMENTS

| | | | |
|---|---|---|---|
| 1,260,492 | 3/1918 | Wedge et al. | 55/46 |
| 1,751,103 | 3/1930 | Schroeder | 55/49 |
| 2,161,055 | 6/1939 | Johnstone et al. | 423/242 |
| 2,166,072 | 7/1939 | Pope et al. | 423/521 |
| 2,173,877 | 9/1939 | Clark et al. | 423/242 |
| 3,782,074 | 1/1974 | Gardenier | 55/94 |
| 3,907,523 | 9/1975 | Melin, Jr. | 55/94 |
| 3,950,493 | 4/1976 | Dorr et al. | 55/73 |
| 3,985,529 | 10/1976 | Petersson | 55/73 |

Primary Examiner—Norman Yudkoff
Attorney, Agent, or Firm—Limbach, Limbach & Sutton

[57] ABSTRACT

A method and device are disclosed for removing sulfur containing contaminents from a combustion product exhaust. The removal process is carried out in two stages wherein the combustion product exhaust is dissolved in water, the water being then heated to drive off the sulfur containing contaminents. The sulfur containing gases are then resolublized in a cold water trap to form a concentrated solution which can then be used as a commercial product.

50 Claims, 3 Drawing Figures

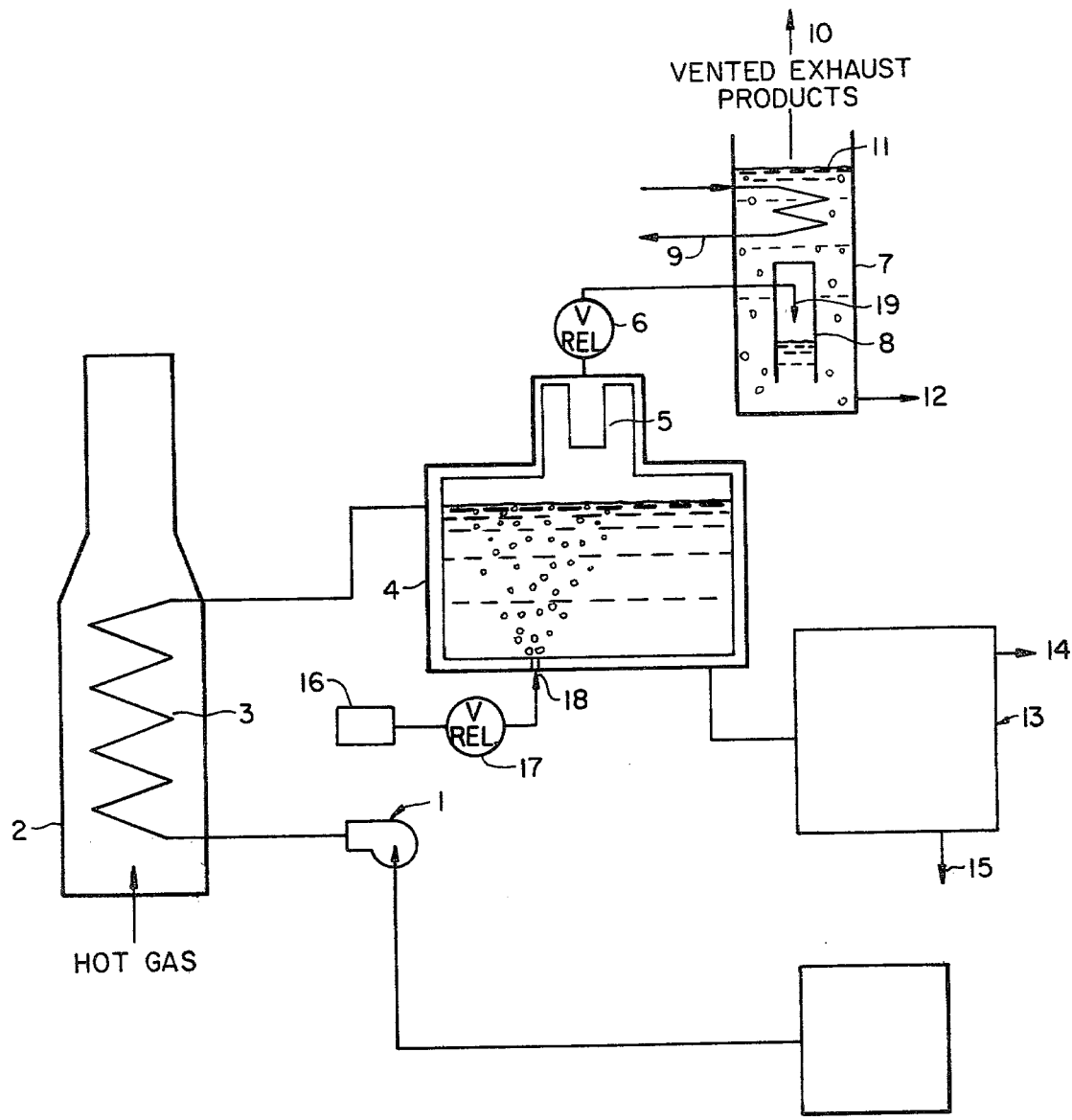
FIG._1.

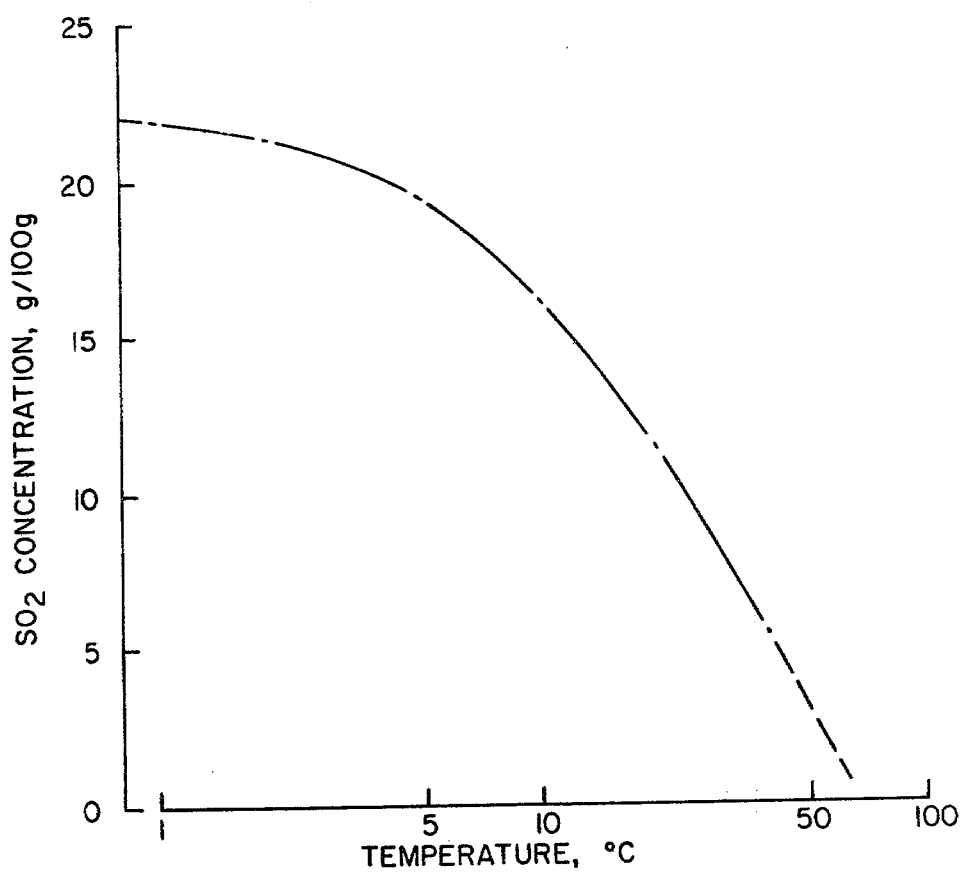
FIG._2.
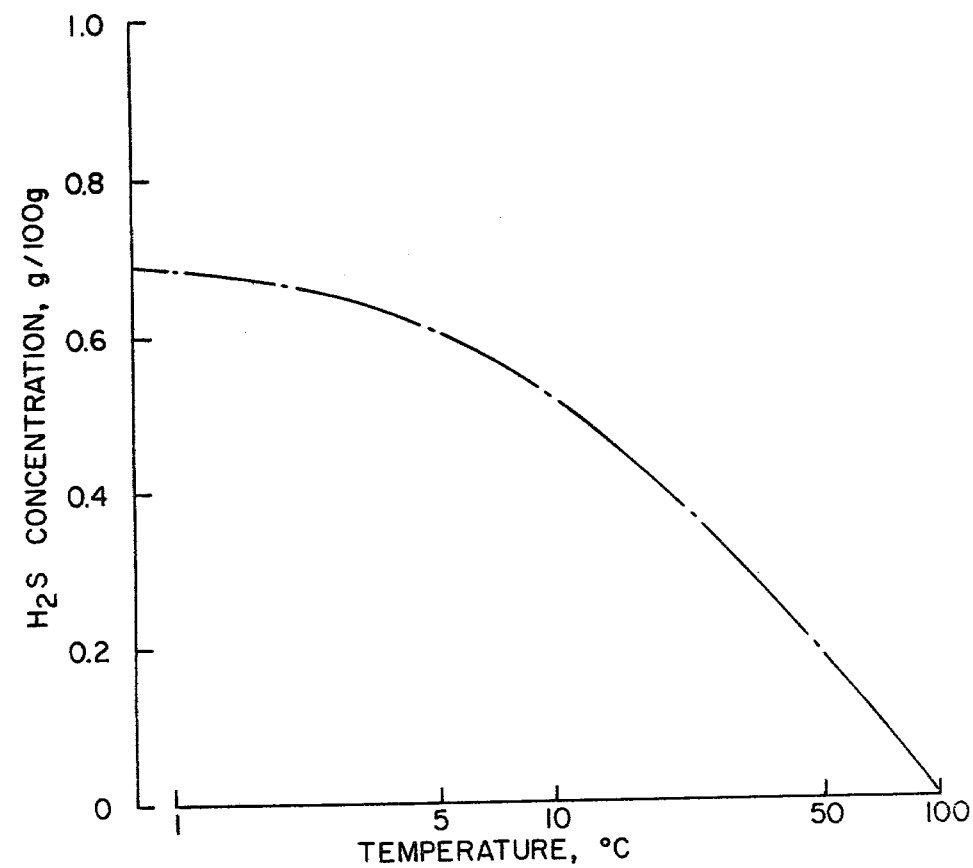
FIG._3.

REMOVAL OF SULFUR COMPOUNDS FROM COMBUSTION PRODUCT EXHAUST

BACKGROUND OF THE INVENTION

As governmental controls become stricter in the control of effluent gases from combustion product exhausts, new and more efficient means are needed to clean up exhaust gases from power plants and other devices. Virtually, all power plants employ fuels, either coal or liquid fuels which contain sulfur. If uncontrolled, effluent gases would deposit into the atmosphere large amounts of sulfur in the form of $SO_2$ and $H_2S$, etc. This is particularly a problem when, in the future, there will be an expanded use of coal derived fuels which are traditionally high in sulfur content. If so, the commonly used stack gas scrubbers in use today will prove to be inadequate.

Stack gas scrubbers serve to absorb sulfur compounds into a water base solution before vapors are exhausted into the atmosphere. The $SO_2$ combines with water to form $H_2SO_3$ according to the following equation:

$$H_2O + SO_2 \rightarrow H_2SO_3$$

Hydrogen sulfide $H_2S$ is also highly toxic by inhalation and is a strong irritant to eyes and mucus membranes. It is soluable in water and combines with water in a scrubber much like $SO_2$.

To prevent $SO_2$ and $H_2S$ from being carried into the atmosphere in water droplets, it is conventional to combine the scrubber effluent with chemicals such as calcium carbonate to precipitate out the sulfur compounds. $SO_2$ combines with calcium carbonate according to the following equation:

$$H_2SO_3 + CaCO_3 \rightarrow CaSO_3 \downarrow + H_2CO_3 \rightarrow H_2O + CO_2$$

Thus, under conventional systems, water and carbon dioxide are driven off while calcium sulfite, a white thick sludge is precipitated. The calcium sulfite sludge accumulates in large quantities and is difficult to dispose of. It furthermore has little intrinsic commercial value, thus presenting a disposal problem with little return benefits.

SUMMARY OF THE INVENTION

It is thus an object of the present invention to substantially eliminate sulfur containing contaminents in combustion product exhaust gases while eliminating the problems outlined herein.

It is a further object of the present invention to substantially eliminate sulfur containing gases from combustion product exhausts while substantially decreasing the quantity of calcium sulfite sludge.

It is yet another object of the present invention to substantially eliminate sulfur containing contaminents from combustion product exhausts while achieving a by-product which is commercially and economically of value.

The present invention can be more fully appreciated by considering the following description together with the drawings wherein FIG. 1 is a block diagram showing the processing stations of the present invention.

FIG. 2 is a graph of saturation concentration of $SO_2$ versus temperature.

FIG. 3 is a graph of saturation concentration of $H_2S$ versus temperature.

Turning in more detail to FIG. 1, the present invention can be more readily visualized by following the block diagram presented therein. The apparatus of FIG. 1 is intended to achieve the objective of removing the exhaust products held in an aqueous solution without allowing the primary sulfur compounds ($SO_2$ and $H_2S$) to escape into the atmosphere and to then concentrate them for more convenient disposal. Exhaust gases being expelled from a power plant or even a parallel-compound duel-fluid heat engine which is the subject of U.S. Pat. No. 3,978,661 can be scrubbed with water to substantially dissolve the contaminants found in the combustion product exhaust. Generally, in a stack operation, the exhaust is run in a counter-current flow relationship with the scrubbing water for more efficient solubilization.

The first processing step comprises bringing the water combustion product exhaust solution to a high temperature wherein the sulfur containing impurities tend to bubble out of the solution for the solubility of $SO_2$ and $H_2S$ drops off dramatically at high temperatures. At this point, reference is made to FIGS. 2 and 3 which show the drastic drop off in solubility of $SO_2$ and $H_2S$ as the temperature of the solution is increased.

The solution can be simply heated in a boiler or stack 2 by following path 3 shown in FIG. 1. However, in order to achieve more efficient separation between the solution and the sulfur containing gases, pump 1 is preferably employed to increase the pressure typically between 2–10 psig and preferably approximately 5 psig. In this way the water can be heated to a higher temperature without boiling for boiling requires increased energy without any return benefit in $SO_2$ and $H_2S$ separation. With a pressure increase of approximately 5 psig, the solution can be heated to approximately 220° F. without boiling.

At this stage, the solution is fed into insulated tank 4 which can consist of a simple glass-lined tank. In tank 4, the sulfur containing contaminants bubble out of the water-combustion product solution and pass through regulator valve 6 into the next processing stage. It has been found that the sulfur containing vapor has a tendency to carry along droplets of liquid solution which, for optimum processing conditions, should be separated from the gas. This is accomplished by merely imposing a screen 5 through which the sulfur containing gas contaminants must pass. The liquid water droplets form on the screen and simply fall back into the solution sitting in tank 4.

As a further optional expedient, it has been found that the sulfur containing gases can be more efficiently separated from the water solution found in tank 4 by bubbling non-reactive gas such as air or nitrogen through the base of tank 4. Schematically, this is shown in FIG. 1 wherein compressed air source 16 passes through regulator 17 and enters tank 4 at its base. The use of an inert gas acts to stir or mechanically drive the sulfur containing contaminants from the water solution. It further serves the function of reducing the partial pressure of the water vapor entering the next stage of the processing system and provides for a more efficient operation by lessening the heat exchange requirements of the next stage as will be described below.

The gaseous mixture primarily composed of vaporous $SO_2$ and $H_2S$ pass through regulator valve 6 to lower the pressure of the gases to a fixed value which is a design parameter of the system. Generally, it has been found that the gaseous mixture should be in the range of approximately 0.5–1 psig, the exact value chosen being dependent upon the design of the next stage, aerator tank 7. The aerator tank comprises a cold water trap 5 made up of internal cylinder 8 to which is introduced the sulfur containing gaseous mixture. The mixture is introduced into chamber 8 as shown by arrow 19. The sulfur containing gases then bubble through the aerator tank which is filled to level 11 with cold water. Heat exchanger 9 is employed to stabilize the temperature of the water in areator tank 7 to be around the ambient temperature but above the freezing point of the solution for the temperature of the water is an important design feature of the present invention. A proper water temperature is chosen so the by-product at 12 can reach a desired sulfur compound concentration value. One can readily design a system wherein virtually all of the $SO_2$ and $H_2S$ is absorbed into the solution of aerator tank 7. The depth of tank 7 and the height of internal cylinder 8 dictate the pressure of the sulfur containing gases exiting regulator 6. As the tank depth increases, increased pressure is necessary for these feed gases.

It is important that the design parameters be chosen so that concentrations of the sulfur containing contaminants be kept below the saturation point in tank 7. The design parameters consist of gas flow exiting regulator valve 6, water depth 11 and temperature of the water. For example, if the temperature in tank 7 is 10° centigrade the water should be drained before $SO_2$ concentration reaches 15 g/100 g etc. But at 20° C., the water should be drained when $SO_2$ concentration is below 8 g/100 g $H_2O$. See FIGS. 2 and 3.

The present invention is intended to eliminate sulfur containing contaminants from combustion exhaust products in a more efficient and economical manner than prior art systems. Combustion exhaust gases, however, contain components in addition to sulfur contaminants. For example, most combustion gases contain $CO_2$, CO, various unburned hydrocarbons, $O_2$, $N_2$, and trace amounts of $NO_2$. A number of these remaining gases are allowed to vent from the system as shown by arrow 10 exiting from aerator tank 7. Although these additional gases could be trapped and used as an extension of the present invention, it is the intent to limit the present invention to the disposal of the primary sulfur containing contaminants, $SO_2$ and $H_2S$.

Once the sulfur containing contaminants have solubilized within the water contained in aerator tank 7, it can be removed as shown schematically by arrow 12. What is achieved is a highly concentrated aqueous solution containing $SO_2$ and $H_2S$ which has a commercial value. The commercial value of this solution derives from its highly concentrated form and its relative purity compared to the initial aqueous solution of combustion exhaust products. Fresh makeup water is added to tank 7 in order to maintain level 11 at a constant height. The temperature of the water in tank 7 is maintained via heat exchanger 9.

The aqueous solution stored in insulated tank 4 must also be drained in order to alleviate undo accumulation. As a means of accomplishing this, the aqueous solution contained in tank 4 is drained to chemical control tank 13. The liquid solution is acidic in nature for sulfur in the form of $SO_3$ combines with water to form sulfuric acid and carbon dioxide combines to form carbonic acid ($H_2CO_3$). Chemical control tank 13 can be used as a holding tank wherein the pH of the trapped aqueous solution can be adjusted. This is commonly done by adding calcium carbonate which will react with sulfur containing residue to form the precipitate calcium sulfite while liberating water and carbon dioxide. As stated previously, this is commonly done in present day scrubbing systems. The present invention differs in that most of the sulfur impurities have been removed from the aqueous solution stored in insulated tank 4 before the addition of the calcium carbonate in tank 13. Thus, the amount of sludge residue is greatly reduced over prior art techniques.

The water held in chemical control tank 13 can then be recycled to a boiler for further use as shown schematically by arrow 14. The precipitate mostly comprised of calcium sulfite can be removed as shown schematically by arrow 15.

A system has thus been described where the primary sulfur pollutants, $SO_2$ and $H_2S$, have been removed and condensed as a commercially valuable product in an aqueous solution with the additional benefit of reduced sludge output from the system. Furthermore, the amount of calcium carbonate needed to precipitate out the sulfur containing impurities is greatly reduced by practicing the present invention.

What is claimed is:

1. A method of removing sulfur containing contaminants from a combustion product exhaust comprising:
   A. contacting the combustion product exhaust with water to substantailly dissolve sulfur containing compounds;
   B. heating said water to substantially reduce the solubility of gaseous sulfur containing compounds dissolved therein; and
   C. contacting the gaseous sulfur containing compounds with a cold water trap to substantially dissolve said gaseous sulfur containing compounds.

2. The method of claim 1 wherein the water which has been contacted with the combustion product exhaust is pressurized before heating.

3. The method of claim 2 wherein said water is pressurized to approximately 2–10 psig before heating.

4. The method of claim 2 wherein said water is pressurized to approximately 5 psig before heating.

5. The method of claim 1 wherein the gaseous sulfur containing compounds are filtered before being contacted with the cold water trap to substantially remove liquid droplets being carried by the gas.

6. The method of claim 1 wherein the cold water trap is kept at a substantially constant temperature.

7. The method of claim 1 wherein the concentrated water-sulfur compound containing solution is removed from said cold water trap.

8. The method of claim 7 wherein water is added to said cold water trap to maintain a substantially constant volume of water.

9. The method of claim 1 wherein the gaseous sulfur containing compounds are reduced in pressure before contacting said cold water trap.

10. The method of claim 9 wherein the pressure of said gaseous sulfur containing compounds is approximately 0.5–1.0 psig before contacting said cold water trap.

11. The method of claim 1 wherein the water having the combustion product exhaust dissolved therein is heated to substantially insolublize the sulfur containing compounds.

12. The method of claim 11 wherein the water having the combustion product exhaust dissolved therein is heated to approximately 220° F.

13. The method of claim 1 wherein said sulfur containing compounds are $SO_2$ and $H_2S$.

14. The method of claim 1 wherein the cold water trap is maintained at approximately ambient temperature.

15. The method of claim 1 wherein said heated water having contacted said combustion product exhaust is treated to control the pH of the solution.

16. The method of claim 15 wherein said treated solution is separated into solid and liquid phases.

17. The method of claim 16 wherein said liquid phase is substantially water which is recycled to a boiler.

18. The method of claim 15 wherein said treatment comprises the the addition of $Ca\ CO_3$.

19. The method of claim 1 wherein said water is heated to a temperature below its boiling point.

20. The method of claim 1 wherein an inert gas is bubbled into said heated water to further separate said water from said sulfur containing compounds.

21. A method of removing $SO_2$ and $H_2S$ from a combustion product exhaust comprising:
  A. contacting the combustion product exhaust with water to substantially dissolve the $SO_2$ and $H_2S$ found therein;
  B. increasing the pressure of said water approximately 2-10 psig;
  C. heating said water to a temperature below its boiling point to substantially reduce the solubility of the $SO_2$ and $H_2S$ dissolved therein;
  D. separating the gaseous $SO_2$ and $H_2S$ from the liquid water;
  E. reducing the pressure of the gaseous $SO_2$ and $H_2S$ to approximately 0.5-1.0 psig;
  F. contacting the gaseous $SO_2$ and $H_2S$ to a cold water trap to substantially dissolve said gases; and
  G. collecting water from said cold water trap having $SO_2$ and $H_2S$ dissolved therein.

22. The method of claim 21 wherein the heated water which has contacted said combustion product exhaust is treated to control the pH of the solution.

23. The method of claim 22 wherein said treated solution is separated into solid and liquid phases.

24. The method of claim 23 wherein said liquid phase is substantially water which is recycled to a boiler.

25. The method of claim 22 wherein said treatment comprises the addition of $CaCO_3$.

26. The method of claim 21 wherein said water is heated to a temperature of approximately 220° F. to substantially reduce the solubility of the $SO_2$ and $H_2S$ dissolved therein.

27. The method of claim 21 wherein an inert gas is bubbled into said heated water to further separate said water from said $SO_2$ and $H_2S$.

28. A device for removing sulfur containing contaminants from a combustion product exhaust comprising:
  A. means for contacting water with said exhaust to substantially dissolve said exhaust product therein;
  B. means for heating said water to substantially reduce the solubility of sulfur containing compounds of said combustion product exhaust dissolved therein; and
  C. means for collecting said sulfur containing compounds and for contacting said compounds with a cold water trap.

29. The device of claim 28 further comprising pump means to increase pressure of said water having said combustion product exhaust dissolved therein before heating the same.

30. The device of claim 29 wherein said water is pressurized to approximately 5 psig before heating.

31. The device of claim 28 wherein said water is pressurized to approximately 2-10 psig before heating.

32. The device of claim 28 further comprising filter means for separating gaseous sulfur containing compounds from liquid droplets before contacting said compounds with the cold water trap.

33. The device of claim 28 wherein said sulfur containing compounds are $SO_2$ and $H_2S$.

34. The device of claim 28 further comprising means for maintaining said cold water trap at a substantially constant temperature.

35. The device of claim 28 further comprising means for removing a concentrated water-sulfur compound containing solution from said cold water trap.

36. The device of claim 28 further comprising means for adding water to said cold water trap to maintain a substantially constant volume of water.

37. The device of claim 28 further comprising means for reducing the pressure of said gaseous sulfur containing compounds before contacting them with the cold water trap.

38. The device of claim 37 wherein said gaseous sulfur containing compounds are at a pressure of approximately 0.5-1.0 psig before contacting said cold water trap.

39. The device of claim 28 wherein said water which has contacted said combustion product exhaust is heated to approximately 220° F.

40. The device of claim 28 wherein said means for contacting said water with said combustion product exhaust is a scrubber.

41. The device of claim 28 further comprising means for controlling the pH of said heated water having contacted said combustion product exhaust.

42. The device of claim 41 further comprising means for separating said water into liquid and solid phases.

43. The device of claim 42 further comprising means for recycling said liquid phase to a boiler.

44. The device of claim 28 further comprising means for injecting bubbles of an inert gas into said heated water to further separate said water from said sulfur containing compounds.

45. A device for removing $SO_2$ and $H_2S$ from a combustion product exhaust comprising:
  A. scrubber means for contacting the combustion product exhaust with water to substantially dissolve the $SO_2$ and $H_2S$ found therein;
  B. means for increasing the pressure of said water approximately 2-10 psig;
  C. means for heating said water to a temperature below its boiling point to substantially reduce the solubility of the $SO_2$ and $H_2S$ dissolved therein;
  D. means for separating the gaseous $SO_2$ and $H_2S$ from the liquid water;
  E. means for reducing the pressure of the gaseous $SO_2$ and $H_2S$ to approximately 0.5-1.0 psig;
  F. cold water trap means for substantially dissolving said $SO_2$ and $H_2S$; and
  G. means for collecting water from said cold water trap means having $SO_2$ and $H_2S$ dissolved therein.

46. The device of claim 45 further comprising means for controlling the pH of said heated water having contacted said combustion product exhaust.

47. The device of claim 46 further comprising means for separating said water into liquid and solid phases.

48. The device of claim 47 further comprising means for recycling said liquid phase to a boiler.

49. The device of claim 45 wherein said water is heated to a temperature of approximately 220° F.

50. The device of claim 45 further comprising means for injecting bubbles of an inert gas into said heated water to further separate said water from said $SO_2$ and $H_2S$.

* * * * *

UNITED STATES PATENT AND TRADEMARK OFFICE
CERTIFICATE OF CORRECTION

PATENT NO. : 4,312,643
DATED : January 26, 1982
INVENTOR(S) : Dah Yu Cheng

It is certified that error appears in the above—identified patent and that said Letters Patent is hereby corrected as shown below:

Col. 1, line 4, between the title of the invention and the "Background of the Invention", insert the following sentence as a new paragraph:

--The Government has rights in this invention pursuant to Contract No. DE-AC03-79ET12442 awarded by the U.S. Department of Energy.--

Signed and Sealed this

Third Day of August 1982

[SEAL]

Attest:

Attesting Officer

GERALD J. MOSSINGHOFF
Commissioner of Patents and Trademarks